United States Patent
King et al.

(10) Patent No.: US 7,367,729 B2
(45) Date of Patent: *May 6, 2008

(54) PRINTER WITHIN A COMPUTER KEYBOARD

(75) Inventors: Tobin Allen King, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/155,627

(22) Filed: Jun. 20, 2005

(65) Prior Publication Data

US 2005/0232675 A1    Oct. 20, 2005

Related U.S. Application Data

(63) Continuation of application No. 10/974,765, filed on Oct. 28, 2004, now Pat. No. 6,918,707, which is a continuation of application No. 10/309,026, filed on Dec. 4, 2002, now Pat. No. 6,830,395, which is a continuation of application No. 09/966,293, filed on Sep. 28, 2001, now Pat. No. 6,641,315, which is a continuation-in-part of application No. 09/112,767, filed on Jul. 10, 1998, now Pat. No. 6,416,167.

(30) Foreign Application Priority Data

Jul. 15, 1997 (AU) ..................... PO7991
Mar. 25, 1998 (AU) ..................... PQ2592

(51) Int. Cl.
*B41J 3/36* (2006.01)
*B41J 5/00* (2006.01)
*B41J 11/00* (2006.01)

(52) U.S. Cl. ............... 400/472; 400/88; 347/104

(58) Field of Classification Search ........ 347/102–109, 347/1–4; 400/472, 715; 374/109; 271/6, 271/34
See application file for complete search history.

(56) References Cited

U.S. PATENT DOCUMENTS 4,423,401 A    12/1983    Mueller (Continued)

FOREIGN PATENT DOCUMENTS

DE    1648322 A    3/1971

(Continued)

OTHER PUBLICATIONS

Noworolski J M et al: "Process for in-plane and out-of-plane single-crystal-silicon thermal microactuators" Sensors and Actuators A, Ch. Elsevier Sequoia S.A., Lausane, vol. 55, No. 1, Jul. 15, 1996, pp. 65-69, XP004077979.

(Continued)

*Primary Examiner*—Daniel J. Colilla
*Assistant Examiner*—'Wynn' Q. Ha

(57) ABSTRACT

A printer is disposed within a housing of a keyboard. The keyboard housing has an upper side bearing a plurality of keypads arranged to interact with a keyboard circuit board located within the housing. A print media entry slot formed through a first side of the housing and a print media ejection slot formed through a second side of the housing opposite the first side provide an entry and exit for a print media transport assembly located between the keyboard circuit board and a bottom side of the housing, the assembly extending across the width of the keyboard circuit board. The assembly is arranged to draw print media through the entry slot.

5 Claims, 3 Drawing Sheets

U.S. PATENT DOCUMENTS

| | | | |
|---|---|---|---|
| 4,553,393 | A | 11/1985 | Ruoff |
| 4,580,148 | A * | 4/1986 | Domoto et al. ............... 347/63 |
| 4,623,965 | A | 11/1986 | Wing |
| 4,672,398 | A | 6/1987 | Kuwabara et al. |
| 4,737,802 | A | 4/1988 | Mielke |
| 4,855,567 | A | 8/1989 | Mueller |
| 4,864,824 | A | 9/1989 | Gabriel et al. |
| 5,029,805 | A | 7/1991 | Albarda et al. |
| 5,048,983 | A * | 9/1991 | Fukae ..................... 400/118.3 |
| 5,115,374 | A | 5/1992 | Hongoh |
| 5,184,907 | A * | 2/1993 | Hamada et al. ............. 400/635 |
| 5,188,464 | A | 2/1993 | Aaron |
| 5,189,473 | A | 2/1993 | Negoro et al. |
| 5,258,774 | A | 11/1993 | Rogers |
| 5,345,403 | A | 9/1994 | Ogawa et al. |
| 5,443,320 | A | 8/1995 | Agata et al. |
| 5,493,409 | A | 2/1996 | Maeda et al. |
| 5,659,345 | A | 8/1997 | Altendorf |
| 5,666,141 | A | 9/1997 | Matoba et al. |
| 5,719,604 | A | 2/1998 | Inui et al. |
| 5,812,159 | A | 9/1998 | Anagnostopoulos et al. |
| 5,848,144 | A | 12/1998 | Ahrens |
| 5,896,155 | A | 4/1999 | Lebens et al. |
| 6,007,187 | A | 12/1999 | Kashino et al. |
| 6,041,106 | A | 3/2000 | Parsadayan et al. |
| 6,155,669 | A | 12/2000 | Donahue et al. |
| 6,158,906 | A | 12/2000 | Simon et al. |
| 6,312,099 | B1 | 11/2001 | Hawkins et al. |
| 6,464,415 | B1 | 10/2002 | Vaghi |
| 6,474,882 | B1 | 11/2002 | Vaghi |
| 6,555,201 | B1 | 4/2003 | Dhuler et al. |
| 7,101,096 | B2 * | 9/2006 | Sasai et al. ................... 400/48 |
| 7,270,492 | B2 * | 9/2007 | King et al. ................. 400/472 |

FOREIGN PATENT DOCUMENTS

| | | |
|---|---|---|
| DE | 2905063 | 8/1980 |
| DE | 3245283 A | 6/1984 |
| DE | 3430155 A | 2/1986 |
| DE | 3716998 A | 12/1988 |
| DE | 3934280 A | 4/1990 |
| DE | 4328433 A | 3/1995 |
| DE | 19516997 A | 11/1995 |
| DE | 19517969 A | 11/1995 |
| DE | 19623620 A1 | 12/1996 |
| DE | 19639717 A | 4/1997 |
| DE | 19532913 A | 3/1998 |
| EP | 0092229 A | 10/1983 |
| EP | 0398031 A | 11/1990 |
| EP | 0427291 A | 5/1991 |
| EP | 0431338 A | 6/1991 |
| EP | 0478956 | 4/1992 |
| EP | 0506232 A | 9/1992 |
| EP | 0510648 A | 10/1992 |
| EP | 0548928 A | 6/1993 |
| EP | 0627314 A | 12/1994 |
| EP | 0634273 A2 | 1/1995 |
| EP | 0642097 A | 3/1995 |
| EP | 0706893 B1 | 4/1996 |
| EP | 0713774 A2 | 5/1996 |
| EP | 0737580 A | 10/1996 |
| EP | 0750993 A | 1/1997 |
| EP | 0768597 A | 4/1997 |
| EP | 0882590 A | 12/1998 |
| FR | 2231076 | 12/1974 |
| GB | 792145 A | 3/1958 |
| GB | 1428239 A | 3/1976 |
| GB | 2262152 A | 6/1993 |
| JP | 56-010472 | * 2/1981 |
| JP | 58112747 A | 7/1983 |
| JP | 58116165 A | 7/1983 |
| JP | 61025849 A | 2/1986 |
| JP | 61268453 A | 11/1986 |
| JP | 01105746 A | 4/1989 |
| JP | 01-128839 A | 5/1989 |
| JP | 0128839 | 5/1989 |
| JP | 01115639 A | 5/1989 |
| JP | 01257058 A | 10/1989 |
| JP | 01306254 A | 12/1989 |
| JP | 02050841 A | 2/1990 |
| JP | 292643 A | 4/1990 |
| JP | 2108544 A | 4/1990 |
| JP | 02-162049 A | 6/1990 |
| JP | 02158348 A | 6/1990 |
| JP | 2265752 A | 10/1990 |
| JP | 03-065348 A | 3/1991 |
| JP | 03653348 | 3/1991 |
| JP | 03112662 A | 5/1991 |
| JP | 03180350 A | 8/1991 |
| JP | 04-001051 A | 1/1992 |
| JP | 04118241 A | 4/1992 |
| JP | 04126225 | 4/1992 |
| JP | 04141429 A | 5/1992 |
| JP | 4353458 A | 12/1992 |
| JP | 04368851 A | 12/1992 |
| JP | 051108278 | 4/1993 |
| JP | 05284765 A | 10/1993 |
| JP | 05318724 A | 12/1993 |
| JP | 691865 A | 4/1994 |
| JP | 691866 A | 4/1994 |
| JP | 07314665 A | 12/1995 |
| JP | 09-113990 A | 5/1997 |
| JP | 11212703 A | 8/1999 |
| WO | WO 94/18010 A | 8/1994 |
| WO | WO 95/10810 | 4/1995 |
| WO | WO 96/32260 | * 11/1996 |
| WO | WO 97/04353 A | 2/1997 |
| WO | WO 97/12689 A | 4/1997 |
| WO | WO 97/50243 A | 12/1997 |
| WO | WO 00/28379 A | 5/2000 |

OTHER PUBLICATIONS

Ataka, Manabu et al, "Fabrication and Operation of Polymide Bimorph Actuators for Ciliary Motion System", Journal of Microelectromechanical Systems, US, IEEE Inc. New York, vol. 2, No. 4, Dec. 1, 1993, pp. 146-150, XP000443412, ISSN: 1057-7157.

Yamagata, Yutaka et al, "A Micro Mobile Mechanism Using Thermal Expansion and its Theoretical Analysis". Proceedeing of the workshop on micro electro mechanical systems (MEMS), US, New York, IEEE; vol. Workshop 7, Jan. 25, 1994, pp. 142-147, XP000528408, ISBN: 0-7803-1834-X.

"Enhanced Communications" website showing Postron Express keyboard/printer. Copyright 1997-2000 http://web.archive.org/web/20020819212351re_/http://www.enhancedcom.net/positronexpress.asp.

"Abledata Database of Assistive Technology", Feb. 1999, p. 2-3 shows Postron Express keyboard/printer.

"TDD Products for PSAPS" (Larson) Mar./Apr. 1997 from 9-11 Magazine NOTE: Establishes that "Positron Express" keyboard integrated with printer was known in 1997.

* cited by examiner

PRINTER WITHIN A COMPUTER KEYBOARD

CROSS REFERENCE TO RELATED APPLICATION

The present application is a continuation of U.S. application Ser. No. 10/974,765 filed on Oct. 28, 2004, now issued as U.S. Pat. No. 6,918,707, which is a continuation of U.S. application Ser. No. 10/309,026 filed on Dec. 4, 2002, now issued as U.S. Pat. No. 6,830,395, which is a continuation of U.S. application Ser. No. 09/966,293 filed on Sep. 28, 2001, now issued as U.S. Pat. No. 6,641,315, which is a continuation in part of U.S. application Ser. No. 09/112,767 filed on Jul. 10, 1998, now issued as U.S. Pat. No. 6,416,167, the entire contents of which are herein incorporated by reference.

FIELD OF INVENTION

This invention relates to a user interface with integrated printing. More particularly, the invention relates to a computer keyboard including a print media transport assembly for an integrated printer.

BACKGROUND TO THE INVENTION

Printers for use with computers can be relatively expensive devices. Accordingly, in a work environment, it is common for a plurality of work stations to be serviced by a single printer station with the computers of those work stations communicating with the printer.

This necessitates people at the work station having to get up and collect their documents from the printer which can be time wasting. Often, all that is required is a single sheet of paper, for example, where a letter is to be generated or where an image is to be viewed and a hard copy of the image is required.

Desktop inkjet printers are available at low cost, but typically take up substantial desk space. Incorporation of the printing function in a desktop computer keyboard frees up this desk space.

While it is technically possible to incorporate a scanning ink jet printer into a keyboard, this has several disadvantages, including excess bulk, and side-to-side vibration as the printhead scans.

Recently, the present inventor has invented ink jet printer technologies suitable for incorporation in a desktop keyboard, such as:

| | | | | | |
|---|---|---|---|---|---|
| 6227652 | 6213588 | 6213589 | 6231163 | 6247795 | 6394581 |
| 6244691 | 6257704 | 6416168 | 6220694 | 6257705 | 6247794 |
| 6234610 | 6247793 | 6264306 | 6241342 | 6247792 | 6264307 |
| 6254220 | 6234611 | 6302528 | 6283582 | 6239821 | 6338547 |
| 6247796 | 6557977 | 6390603 | 6362843 | 6293653 | 6312107 |
| 6227653 | 6234609 | 6238040 | 6188415 | 6227654 | 6209989 |
| 6247791 | 6336710 | 6217153 | 6416167 | 6243113 | 6283581 |
| 6247790 | 6260953 | 6267469 | 6273544 | 6309048 | 6420196 |
| 6443558 | 6439689 | 6378989 | 6848181 | 6634735 | 6623101 |
| 6406129 | 6505916 | 6457809 | 6550895 | 6457812 | 6428133 |

These ink jet technologies are suitable for the construction of miniature, low cost pagewidth printers, which can readily fit within a keyboard form factor.

SUMMARY OF THE INVENTION

According to a first aspect of the present invention there is provided a printer including
a housing having an upper side bearing a plurality of keypads arranged to interact with a keyboard circuit board located within the housing;
a print media entry slot formed through a first side of the housing and a print media ejection slot formed through a second side of the housing opposite the first side; and
a print media transport assembly located between the keyboard circuit board and a bottom side of the housing, said assembly arranged to draw print media through the entry slot.

Preferably the print media transport assembly includes a belt disposed about at least two rollers and arranged to transport print media from the entry slot to a printhead assembly.

The printer may further include a planar member biased against the belt to maintain planarity of the belt.

In one embodiment the planar member comprises a sprung metal plate.

A spiked wheel may be coupled to one of the at least two rollers and arranged to transport the print media from the printhead assembly through the media ejection slot.

More specifically, in one embodiment the present invention provides a printer including:
a housing having an upper side bearing a keyboard and an opposing underside for placement upon a surface;
the housing defining a print media entry slot formed into a side of the housing facing towards an operator in use and a print media ejection slot formed into a side of the housing facing away from the operator in use;
the key board being arranged to interact with a keyboard circuit board located within the housing; and
a belt and roller assembly located between the keyboard circuit board and the underside of the housing, said assembly arranged to draw print media through the entry slot towards a printhead assembly; and
a driven spiked wheel located between the printhead assembly and the ejection slot and arranged to pull the print media across the printhead assembly and eject it through the ejection slot.

BRIEF DESCRIPTION OF THE DRAWINGS

The invention is now described by way of example with reference to the accompanying diagrammatic drawings in which.

DETAILED DESCRIPTION OF THE DRAWINGS

Figure 2:
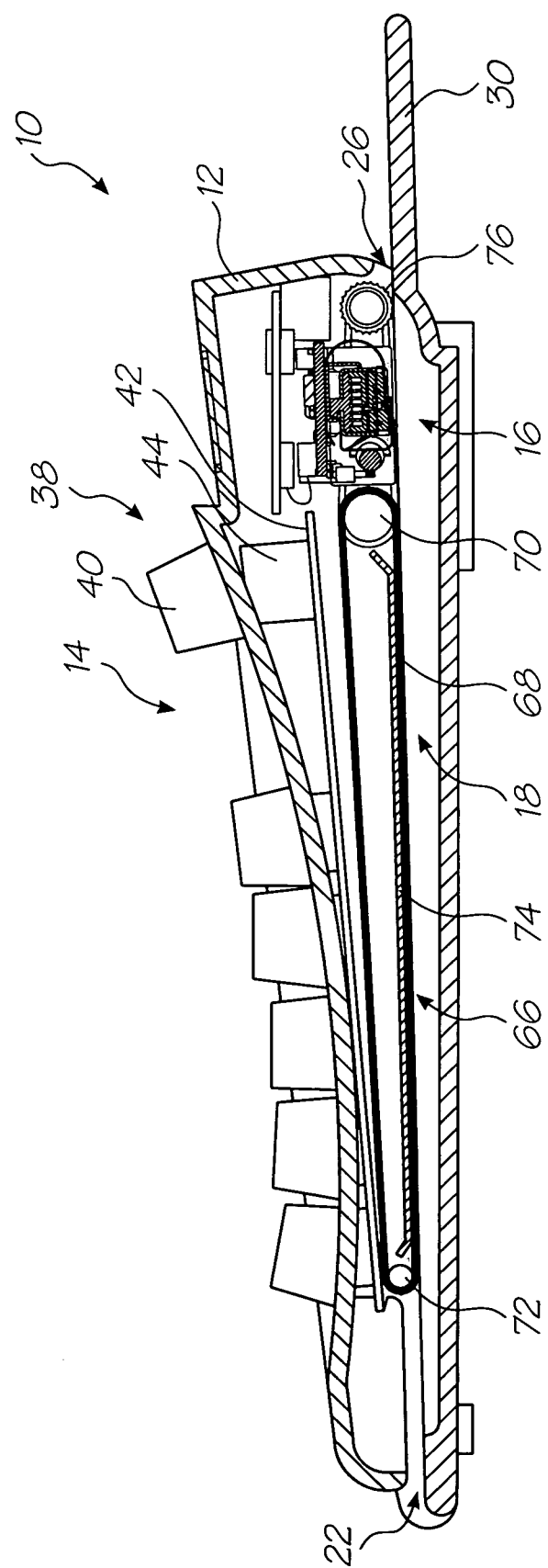
FIG. 2 shows a sectional side view of the keyboard.
Figure 3:
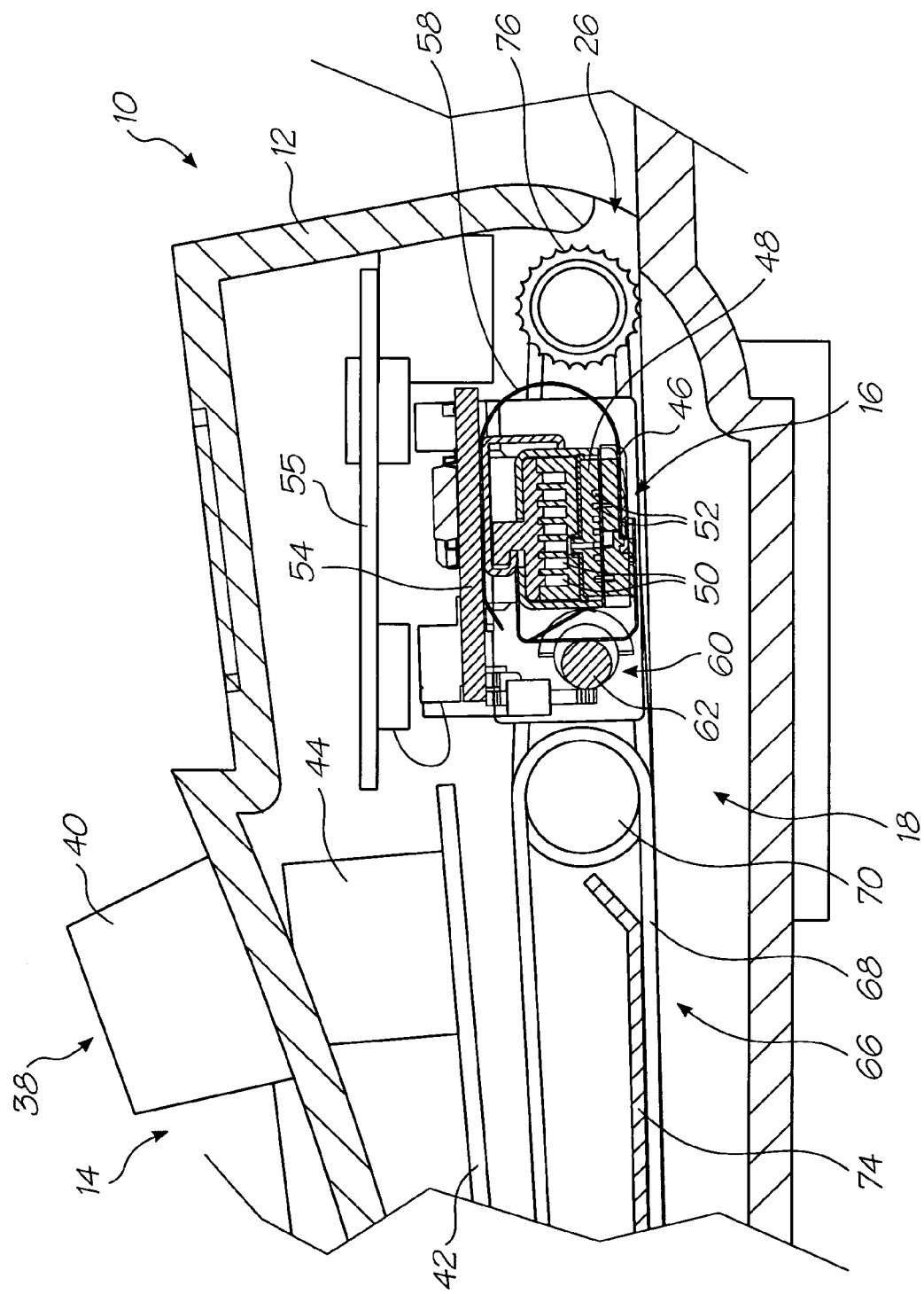
FIG. 3 shows, on an enlarged scale, a sectional side view of part of the keyboard.

In the drawings, reference numeral 10 generally designates a keyboard in accordance with the invention. The keyboard 10 is intended particularly for use with a computer. The keyboard 10 comprises a housing 12 on which a keypad 14 is arranged. A printer 16 (FIGS. 2 and 3) is contained in a chamber 18 defined in the housing 12 of the keyboard 10.

The housing 12 is dimensioned similarly to a conventional computer keyboard and is substantially rectangular when viewed in plan having a pair of opposed, longer sides and a pair of opposed, shorter sides. An input slot 22 is defined in one of the longer sides of the housing 12 for feeding print media in the form of a sheet of paper 24 to the printer 16. Preferably, the input slot 22 is defined in that side of the housing 12 which, in use, is closer to a user of the keyboard 10.

An ejection slot 26 is defined in an opposed, longer side of the housing through which the sheet of print media, incorporating an image 28, is ejected after completion of printing. An exit tray 30 extends outwardly from the ejection slot 26 on to which the sheet of paper 24 is fed after printing.

The keypad 14 includes an array if keys 38 arranged in a QWERTY keypad 32, a numerals keypad 34 and a plurality of control keys 36. Each key 38 of the keypad 14 includes a key cap 40 which communicates with a keyboard circuit board 42 (FIGS. 2 and 3) through an opening in a top surface of the housing 12. The key caps 40 engage key switches 44 mounted on the circuit board 42.

The printer 16 comprises a page width ink jet printhead 46 mounted in a support 48. The printhead 46 is a multi-color printhead for printing photo quality images 28. Accordingly, the support 48 includes a plurality of galleries 50, each of which contains a different color ink to be fed via passages 52 to the printhead 46.

Figure 1:
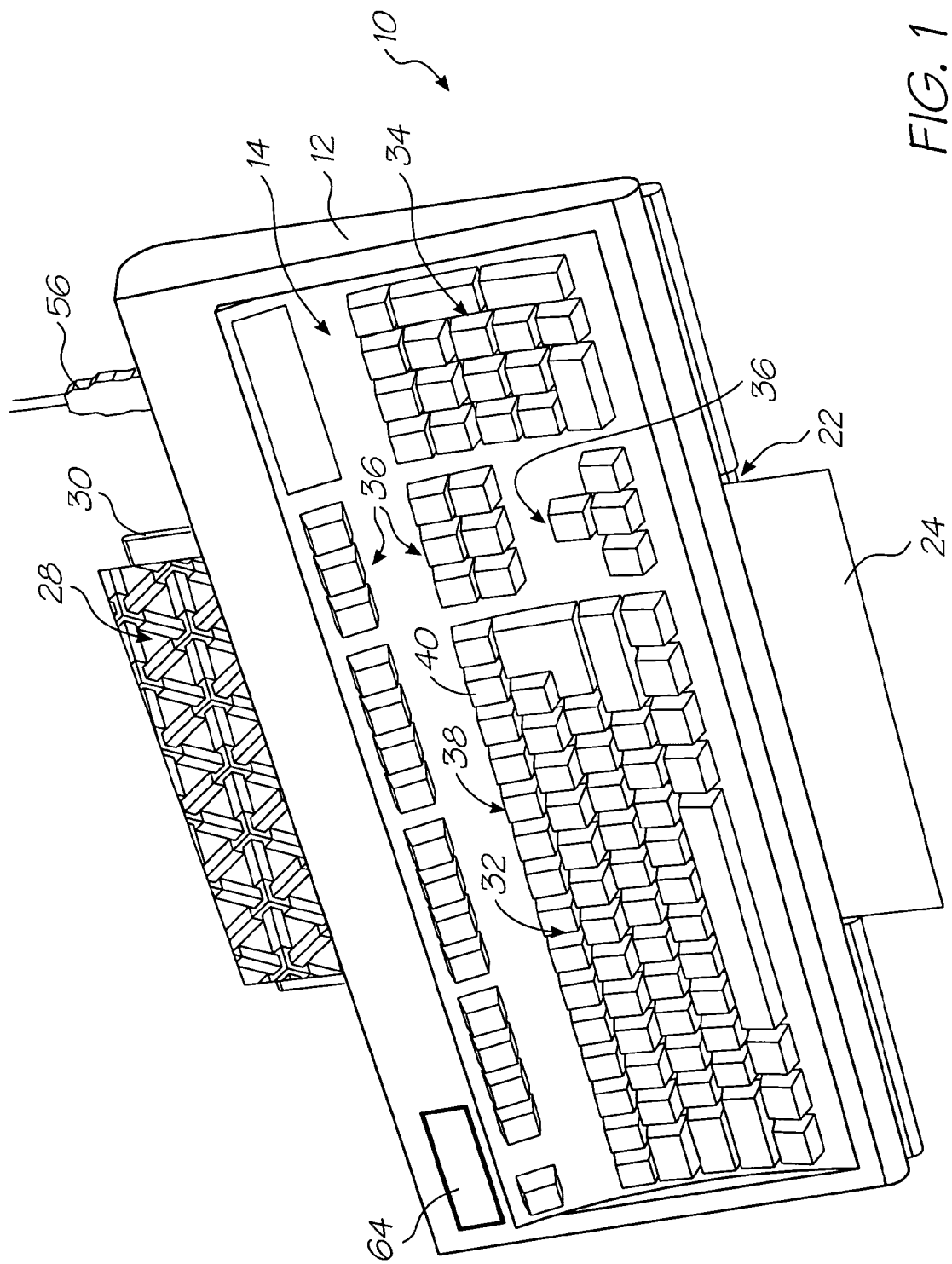
FIG. 1 shows a three dimensional view of a keyboard, in accordance with the invention.

The printer 16 includes a controller printed circuit board (PCB) 55. The PCB 55 receives printing commands from the computer (not shown) via a USB connector 56 (FIG. 1). A printhead PCB 54 communicates with the printhead 46 via a TAB automated bond film 58 or any other suitable, flexible film. The controller PCB 55 connects to the printhead PCB 54 via a flexible film.

A retaining device, in the form of a locking member 60, releasably locks the printer 16 in position in the chamber 18 of the housing 12. The locking device 60 includes a cam-like locking member 62.

Further, the printer 16 includes an ink supply cartridge (not shown) for feeding ink to the galleries 50 of the printhead support 48. The ink supply cartridge is accessed through an opening, closed off by a lid 64 (FIG. 1), in a top surface of the housing 12 to replace the cartridge when its supply of ink has been depleted.

The keyboard 10 includes a feed mechanism 66 for feeding the sheet of paper 24 to the printer 16. The feed mechanism 66 comprises an endless belt 68 which is rotated by a drive roller 70 and extends about an opposed, idler roller 72. A planar member in the form of a sprung metal plate 74 bears against the belt 68 to maintain the planarity of the belt 68 and, accordingly, the sheet of paper 24.

An engaging means, in the form of at least one spiked wheel 76, is arranged intermediate the printer 16 and the ejection slot 26. The or each, spiked wheel 76 engages the sheet of paper 24, after printing of the image 28, and feeds the sheet of paper 24 through the ejection slot 26 to be accessed by the user.

In use, when an image 28 is to be printed, the user inserts a sheet of paper into the keyboard through the input slot 22 where it is fed to the printer 16 by the feed arrangement 66. By means of an appropriate command via the computer, the information or image to be printed is fed to the printer 16 via the USB connector 56 and the controller PCB 55. The printer 16 is controlled by the PCB 55 to print the image 28 on the sheet of paper 24 and to cause ejection of the sheet of paper 24 together with its printed image 28 thereon through the ejection slot 26.

It is an advantage of the invention that a computer peripheral is provided which enables a person rapidly to obtain copies of images while seated before the person's computer. In this regard, it is to be noted that the printer 16 is a high speed printer which can print at rates of up to 30 pages per minute. Hence, the need for using a communal work station is obviated. In addition, the incorporation of the printer within the keyboard 10 considerably reduces the space required for a computer together with its peripherals and, in so doing, providing more space to a user. It will be appreciated that this can be of major benefit where the work station is a confined working space.

The invention claimed is:

1. A printer configured as a peripheral device for a computer, the printer including:
   a housing having an upper side bearing a plurality of keypads arranged to interact with a keyboard circuit board located beneath the keypads and within the housing, the keypads and keyboard circuit board forming a keyboard peripheral device for the computer;
   a print media entry slot formed through a first side of the housing and a print media ejection slot formed through a second side of the housing opposite the first side;
   a print media transport assembly located between the keyboard circuit board and a bottom side of the housing, said assembly arranged to draw print media through the entry slot;
   a pagewidth printhead located between the print media entry slot and the print media ejection slot and extending substantially the width of said print media ejection slot for printing onto print media transported by said print media transport assembly; and
   a data connector for connecting the printer to the computer for data transmission therebetween,
   wherein the print media transport assembly extends substantially beneath the width of the keyboard circuit board.

2. A printer according to claim 1, wherein the print media transport assembly includes a belt disposed about at least two rollers and arranged to transport print media from the entry slot to the printhead.

3. A printer according to claim 2, further including a planar member biased against the belt to maintain planarity of the belt.

4. A printer according to claim 3, wherein the planar member comprises a sprung metal plate.

5. A printer according to claim 2, further including a spiked wheel coupled to one of the at least two rollers and arranged to transport the print media from the printhead through the media ejection slot.

* * * * *